United States Patent
Jackson et al.

(10) Patent No.: US 10,539,241 B2
(45) Date of Patent: Jan. 21, 2020

(54) YOKE FOR ROTARY VALVE

(71) Applicant: FISHER CONTROLS INTERNATIONAL LLC, Marshalltown, IA (US)

(72) Inventors: Trenton F. Jackson, Marshalltown, IA (US); Robert M. Meloy, Marshalltown, IA (US)

(73) Assignee: FISHER CONTROLS INTERNATIONAL LLC, Marshalltown, IA (US)

( * ) Notice: Subject to any disclaimer, the term of this patent is extended or adjusted under 35 U.S.C. 154(b) by 88 days.

(21) Appl. No.: 15/726,654

(22) Filed: Oct. 6, 2017

(65) Prior Publication Data
US 2018/0106384 A1    Apr. 19, 2018

Related U.S. Application Data

(60) Provisional application No. 62/409,046, filed on Oct. 17, 2016.

(51) Int. Cl.
*F16K 5/06* (2006.01)
(52) U.S. Cl.
CPC ................. *F16K 5/0647* (2013.01)
(58) Field of Classification Search
USPC ....................................................... 251/292
See application file for complete search history.

(56) References Cited

U.S. PATENT DOCUMENTS

| 2,088,937 | A |   | 8/1937  | Aderhold, Jr. |
| 2,694,547 | A | * | 11/1954 | MacGregor ............ F16K 27/08 251/264 |
| 5,820,103 | A |   | 10/1998 | Nilsson et al. |
| 2009/0184276 | A1 |  | 7/2009 | Olberding et al. |
| 2015/0059874 | A1 | * | 3/2015 | Loveless ................. F16K 27/00 137/485 |
| 2015/0240965 | A1 | * | 8/2015 | Arnold .................. F16K 31/163 251/58 |

OTHER PUBLICATIONS

International Search Report and Written Opinion for Application No. PCT/US2017/054304 dated Jan. 17, 2018.

* cited by examiner

*Primary Examiner* — John Fox
(74) *Attorney, Agent, or Firm* — Marshall, Gerstein & Borun LLP (57) ABSTRACT

A valve apparatus may include a control valve including valve body having an inlet, an outlet, and a flow path. A rotational valve stem may extend along a longitudinal axis, the valve stem having a top portion and a bottom portion, the valve stem operatively coupled to a control element movably disposed in the flow path. A yoke may be attached to the valve body and arranged to operatively couple the valve body to an actuator, the yoke including a first bracket having an aperture and a second bracket having an aperture. A bushing may be arranged to align an actuator shaft of the actuator to the longitudinal axis of the valve stem, the bushing having a first portion and a second portion, the first portion engaging within the aperture of the first bracket and the second portion engaging the aperture of the second bracket.

16 Claims, 6 Drawing Sheets

YOKE FOR ROTARY VALVE

FIELD OF THE INVENTION

The present disclosure relates to fluid control devices and, more particularly, to rotary fluid control valves.

BACKGROUND

It is generally known that power plants, process plants, such as refineries, chemical plants or pulp and paper plants, consist of numerous process control loops connected together to produce various products and to control fluid flow. Flow control valves are disposed in the process control loop and typically use a control element such as a valve plug, a valve disc, a globe, or other suitable control element, in order to manipulate a fluid flowing through the system, such as gas, steam, water, or a chemical compound.

It is generally understood that various control valve configurations may be specifically applicable for certain applications. For example, when a quick-opening valve with a narrow control range is suitable, a rotary control valve, such as a butterfly valve, may be used. In any configuration, such control valves are generally coupled to a control device such as an actuator, which controls the exact opening amount of the control valve in response to a control signal. In each case, the valve stem extends into the valve body and is connected to the control element.

Figure 1:
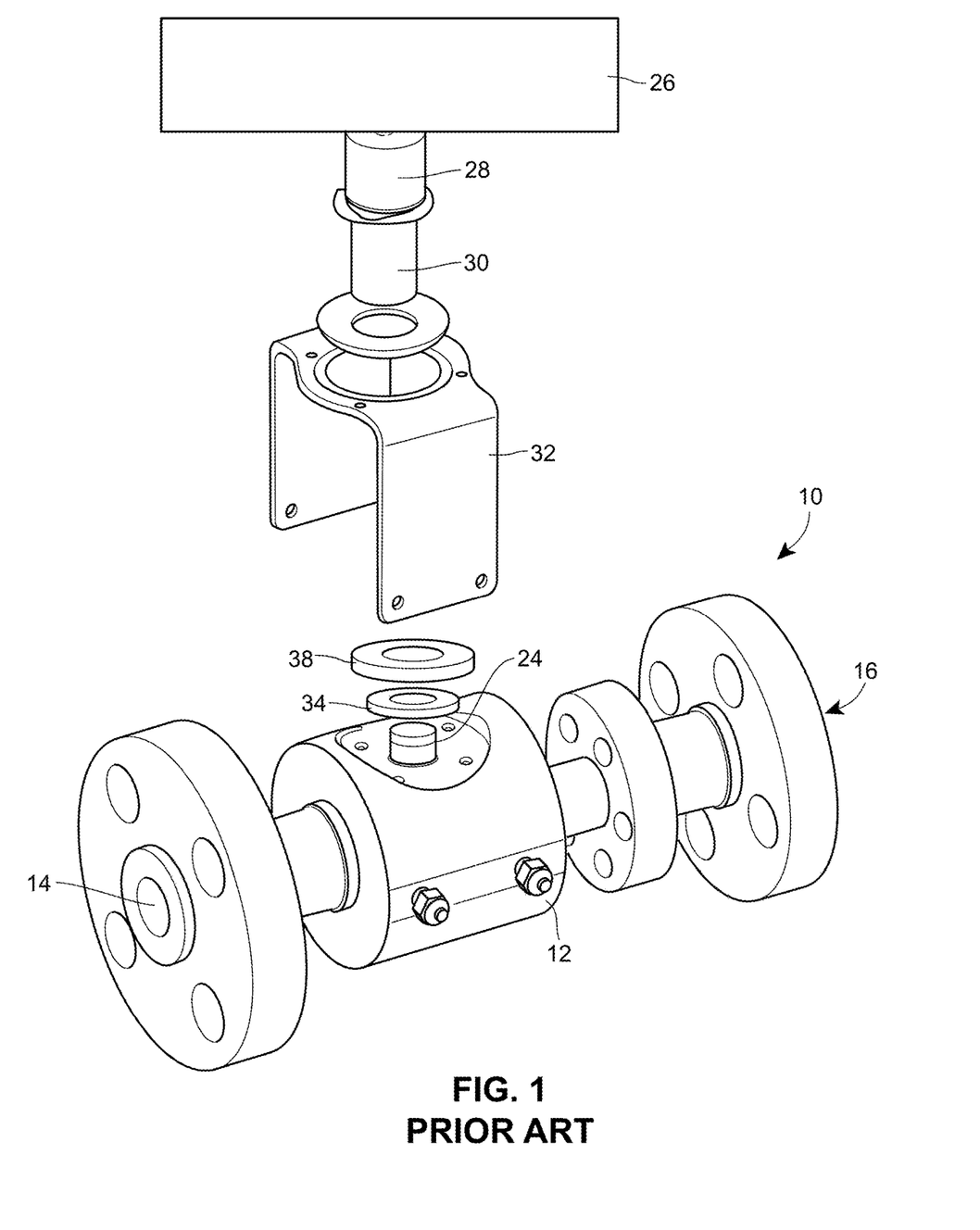
FIG. 1 is an exploded view of an exemplary prior art rotary control valve and schematic drawing of an actuator.
Figure 2:
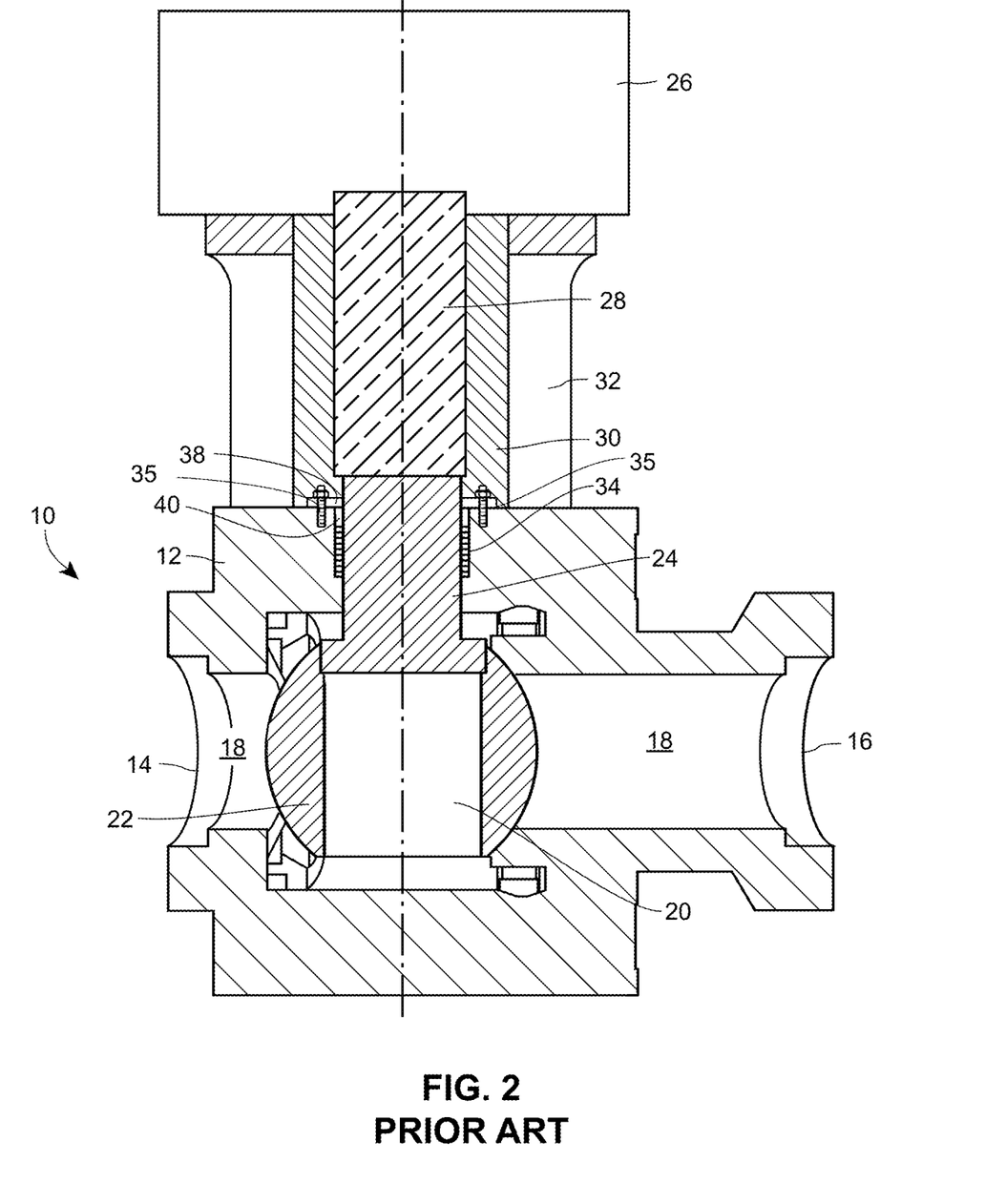
FIG. 2 is a cross-sectional view of the exemplary prior art rotary control valve and actuator of FIG. 1.

In order to provide axial support and to prevent or minimize leakage past the valve stem, control valves typically employ valve packing around the valve stem. For example, FIGS. 1 and 2 illustrate an exemplary rotary control valve 10 of the type commonly employed in process control systems, specifically a quarter turn on/off floating ball valve. The control valve 10 includes a valve body 12, a valve inlet 14, a valve outlet 16, and a flow path 18 that extends between the inlet 14 and the outlet 16. The flow path 18 includes a control passage 20 and a control element 22 is movably disposed in the control passage 20. In the example of FIGS. 1 and 2, the control element 22 in the control valve 10 takes the form of a rotary control element and may be, for example, a valve disc, a globe or ball, or any other form of a rotating control element. In the example of FIGS. 1 and 2, the control element 22 is a floating ball connected to a valve stem 24 which, as outlined above, is a rotary stem. The valve stem 24 is operatively coupled to an actuator 26 by an actuator shaft 28, and the actuator 26 may be any kind of suitable actuator of the types commonly employed in the art. The control element 22 is positioned such that the floating ball is disposed in the control passage 20. Using the actuator 26, the position of the control element 22 within the control passage 20 may be determined, thereby controlling the amount of fluid flow through the control passage 20. The floating ball valve stem 24 may be supported by a shaft adapter 30 and a side-mounted bracket 32 or yoke that operatively attaches the actuator 26 and the valve body 12.

The control valve 10 includes a valve packing 34 which is disposed within the valve body 12. The control valve 10 includes a packing gland 38 that surrounds a portion of the valve stem 24 and includes a lower portion 40 that extends into a position to apply a compressive force to the packing 34. The packing gland 38 may be suitably bolted via fasteners 35 to the valve body 12 (either directly to the valve body 12, or to a bonnet, should the valve have a bonnet).

In a quarter turn on/off floating ball valve, like the control valve 10 illustrated in FIGS. 1 and 2, the valve packing 34 provides minimal axial support to the valve stem 24 when the valve stem 24 is subject to excess side load, axial load, or bending moment. The valve stem 24 may become misaligned with the actuator shaft 28, causing the valve stem 24 to contact the valve body 12. In these instances, the valve 10 requires considerably more torque to operate under normal conditions and galling may occur. Problems resulting from galling include, but are not limited to, diminished life span of valve components and valve failure.

SUMMARY

In accordance with a first exemplary aspect, a valve apparatus may include a control valve including a valve body having an inlet, an outlet, and a flow path extending between the inlet and the outlet, a rotational valve stem extending along a longitudinal axis. The valve stem may have a top portion and a bottom portion disposed within the valve body. The valve stem may be operatively coupled to a control element movably disposed in the flow path. The apparatus may further include a yoke attached to the valve body and arranged to operatively couple the valve body to an actuator, the yoke including a first bracket having an aperture and a second bracket having an aperture. A bushing may be arranged to align an actuator shaft of the actuator to the longitudinal axis of the valve stem, the bushing having a first portion and a second portion where the first portion engages within the aperture of the first bracket and the second portion engages the aperture of the second bracket.

In accordance with a second exemplary aspect, a valve and yoke assembly may include a valve body having an inlet, an outlet, and a flow path extending between the inlet and the outlet. A rotational valve stem may be at least partially disposed within the valve body and extending along a longitudinal axis. The valve stem may be operatively coupled to a control element disposed in the flow path and moveable between an open position and a closed position. Further, the assembly may include a yoke attached to the valve body and including an aperture. The yoke may be arranged to operatively couple an actuator to the valve body. A bushing may be at least partially engaged with the aperture of the yoke and aligned with the longitudinal axis of the valve stem and arranged to operatively align the valve stem with an actuator shaft.

In accordance with a third exemplary aspect, a method may include providing a valve body having an inlet, an outlet, and a flow path extending between the inlet and the outlet. A valve stem may extend along a longitudinal axis and have a top portion protruding from the valve body and a bottom portion disposed within the valve body. The valve stem may be operatively coupled to a control element movably disposed in the flow path. The method may include providing a yoke including an aperture, and a bushing at least partially disposed in the aperture of the yoke. The bushing may be arranged to align an actuator shaft of an actuator with the longitudinal axis of the valve stem. The method may further include aligning the bushing of the yoke with the longitudinal axis of the valve stem, and fastening the yoke to the valve body such that the bushing remains in alignment with the longitudinal axis of the valve stem.

In further accordance with any one or more of the foregoing first, second, and third exemplary aspects, a valve apparatus, valve and yoke assembly and/or a method may include any one or more of the following preferred forms.

In a preferred form, at least a portion of the bushing may be affixed within the aperture of the first bracket of the yoke.

In a preferred form, at least a portion of the bushing may be affixed within the aperture of the second bracket of the yoke.

In a preferred form, the first bracket of the yoke may be fixedly attached to the valve body.

In a preferred form, the yoke may be removably attached to the actuator mounting bracket/second bracket.

In a preferred form, the aperture of the first bracket may be formed in a bridge portion and the aperture of the second bracket may be formed in a bridge portion of the second bracket. The bridge portion of the first bracket may be parallel to the bridge portion of the second bracket when the first bracket and second bracket are attached.

In a preferred form, the aperture of the first bracket may be coaxially aligned with the aperture of the second bracket. The apertures of the first and second brackets may be coaxially aligned with the longitudinal axis of the valve stem.

In a preferred form, the bushing may extend along the longitudinal axis of the valve stem. The bushing may have an outer diameter sized for insertion into the aperture of the second bracket and an inner diameter sized to receive an actuator shaft.

In a preferred form, the first bracket may be adjacent to the second bracket such that the aperture of the first bracket is parallel to the aperture of the second bracket.

In a preferred form, the first bracket of the yoke may be attached to the valve body and may be attached to the second bracket.

In a preferred form, the bushing may include an inner diameter and an outer diameter. The inner diameter may be sized to provide a clearance fit with an actuator shaft of an actuator, and the outer diameter may be sized to provide a rigid connection fit with the first bracket and an alignment fit with the aperture of the second bracket of the yoke.

In a preferred form, a portion of the bushing may be disposed outside of the yoke. The portion of the bushing may be sized for insertion into an aperture of an actuator mounting bracket/the second bracket and may be sized to receive an actuator shaft of an actuator.

In a preferred form, a dowel may be at least partially disposed within a bore formed in the valve body and at least partially disposed within a bore formed in the first bracket of the yoke. The bore of the valve body may be sized to receive the dowel to allow the yoke to detach from the valve body.

In a preferred form, a dowel may be at least partially disposed within a bore of the valve body and may provide a visual indicator of alignment of the valve stem and the bushing.

In a preferred form, a thrust bearing may be attached to the actuator shaft.

In a preferred form, the aperture of the first bracket may have a diameter and the aperture of the second bracket may have a different diameter. The diameter of the aperture of the first bracket may be smaller than the diameter of the aperture of the second bracket.

In a preferred form, an actuator may include an actuator shaft operatively coupled to the valve stem and disposed through the bushing. The actuator shaft may be coaxially aligned with the valve stem.

In a preferred form, the yoke may include a first parallel arm, a second parallel arm, and a bridge portion connecting the first and second parallel arms. The first and second parallel arms and the bridge portion may form a U-shaped bracket.

In a preferred form of the method, fastening the yoke may include fixedly attaching the yoke to the valve body.

A preferred form of the method may include inserting a dowel through a bore formed in the valve body and a bore formed in the yoke and coaxially aligned with the bore of the valve body. The dowel may be partially disposed within the bore of the valve body and partially disposed within the bore of the yoke.

A preferred form of the method may include determining an occurrence of a tampering event to the valve body and the yoke by inspecting a location of the dowel relative to the bore of the yoke; and further identifying the occurrence of the tampering event when the dowel is completely disposed within the bore of the valve body.

A preferred form of the method may include shipping the valve body fixedly attached to the yoke, where the valve stem is aligned with the bushing and wherein the valve body and yoke are configured to operatively couple to an actuator.

A preferred form of the method may include attaching an actuator mounting bracket to the yoke, the actuator mounting bracket including an aperture coaxially aligned with the aperture of the yoke.

In a preferred form, attaching the mounting bracket to the yoke may include aligning the aperture of the actuator mounting bracket with an outer diameter of the bushing and inserting a portion of the bushing into the aperture of the actuator mounting bracket.

A preferred form of the method may include inserting an actuator shaft of an actuator through the bushing partially disposed within the aperture of the yoke and partially disposed within the aperture of the actuator mounting bracket.

A preferred form of the method may include operatively coupling the actuator shaft of the actuator to the top portion of the valve stem.

A preferred form of the method may include fixedly arranging the bushing within the aperture of the actuator mounting bracket.

DETAILED DESCRIPTION OF THE PREFERRED EMBODIMENTS

Figure 3:
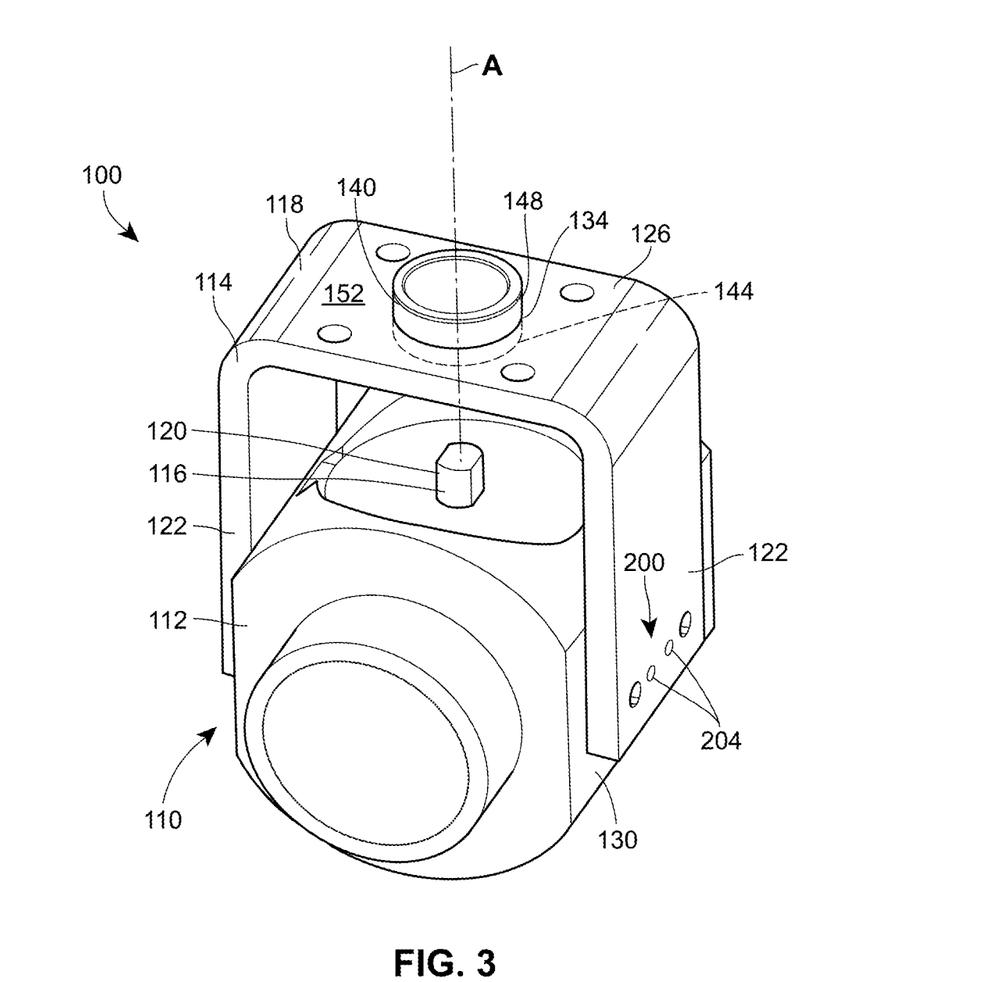
FIG. 3 is a perspective view of a valve apparatus constructed in accordance with the principles of the present disclosure.
Figure 4:
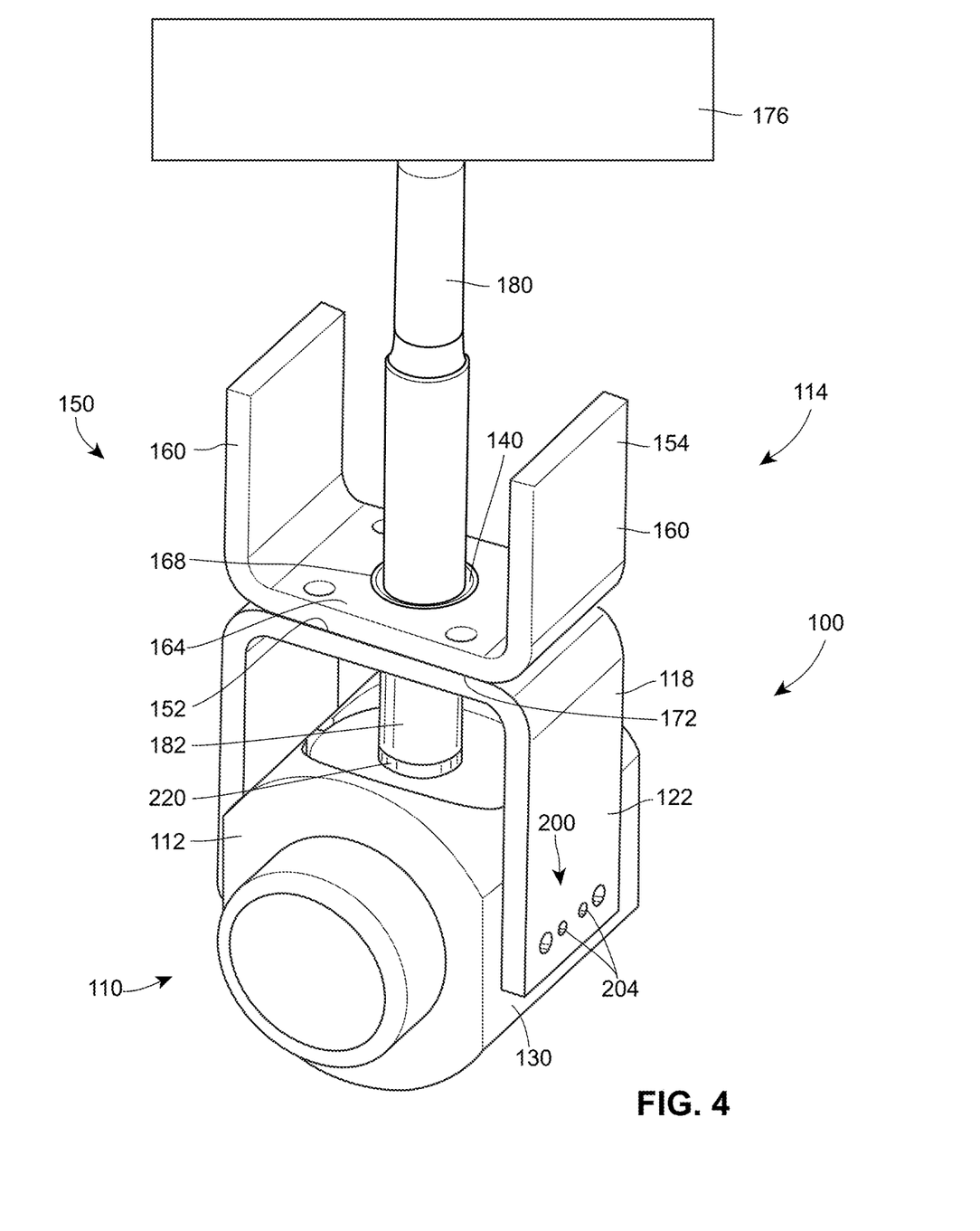
FIG. 4 is a perspective view of an actuator operatively attached to a valve and yoke assembly including the valve apparatus of FIG. 3.

Referring now to a first exemplary arrangement in FIG. 3, a valve apparatus 100 includes a control valve 110 having a valve body 112 and a yoke 114 attached to the valve body 112. The apparatus 100 illustrated in FIG. 3 is configured to align an actuator shaft of an actuator to a valve stem 116 of the control valve 110 and to provide axial support to the valve stem 116 to maintain valve and actuator alignment. FIG. 4 illustrates the valve apparatus 100 of FIG. 3 with an additional bracket for mounting an actuator to the apparatus 100. Turning back to FIG. 3, the control valve 110 may be a conventional rotary control valve known in the art, for example, such as, a floating ball valve similarly configured to the floating ball valve 10 illustrated in FIGS. 1 and 2. As known to those of ordinary skill in the art, the valve body 112 includes an inlet, an outlet, and a flow path extending between the inlet and the outlet. A rotational valve stem 116 extends along a longitudinal axis A and includes a top portion 120 and a bottom portion. The bottom portion of the valve stem 116 is disposed within the valve body 112 and is operatively coupled to a control element movably disposed in the flow path between an open position and a closed position. The top portion 120 of the valve stem 116 extends in a vertical direction along the longitudinal axis A and protrudes from the valve body 112. The control valve 110 may be any type of valve, such as a throttle valve and an on/off valve.

The yoke 114 is attached to the valve body 112 and is arranged to operatively couple the valve body 112 to an actuator. The yoke 114 includes a first bracket 118, which may be generally U-shaped, having first and second parallel arms 122 and a bridge portion 126 perpendicularly aligned to the parallel arms 122. The bridge portion 126 connects the first and second parallel arms 122, and in the illustrated example of FIG. 3, each of the parallel arms 122 forms a right angle with the bridge portion 126 at a connecting joint. Each of the first and second parallel arms 122 is configured to attach to one of a parallel front side and a parallel back side 130 of the valve body 112. The yoke 114 includes an aperture 134 formed in the bridge portion 126 of the first bracket 118. The aperture 134 is circular and is sized to receive a round bushing 140. The first bracket 118 of the yoke 114 may be fixedly attached to the valve body 112 to assure axial alignment of the bushing 140, the aperture 134 of the first bracket 118, and the valve stem 116. The first bracket 118 may be attached to the valve body 112 by a plurality of fasteners that traverse through bores formed in both the bracket 118 and the valve body 112. The yoke 114 may include a second bracket 154, as illustrated and described below with reference to FIG. 4.

The bushing 140 is at least partially engaged with the aperture 134 of the first bracket 118 and arranged to align an actuator shaft of an actuator to the longitudinal axis A of the valve stem 116. The bushing 140 includes a first portion 144 disposed within the aperture 134 of the first bracket 118 (shown in dashed lines in FIG. 3) and a second portion 148 extending beyond an exterior surface 152 of the bridge portion 126. The bushing 140 may be attached to the yoke 114 before the yoke 114 is attached to the valve body 112, or the bushing 140 may be attached to the yoke 114 after the yoke 114 is attached to the valve body 112. The placement of the aperture 134 of the yoke 114 is arranged to align with the longitudinal axis A of the valve stem 116. In other words, the aperture 134 of the first bracket 118 and the bushing 140 share the longitudinal axis A of the valve stem 116 as a central axis. The bushing 140 may be rigidly connected to the yoke 114, and in particular, the first portion 144 of the bushing 140 may be affixed within the aperture 134 of the first bracket 118. The bushing 140 may be fixedly attached by press-fit, friction-fit, and/or other suitable means within the aperture 134 of the first bracket 118.

As shown in FIG. 4, the yoke 114 includes a second bracket 154, which is also referred to herein as an actuator mounting bracket. The control valve 110, yoke 114 (including both the first bracket 118 and the second bracket 154), and bushing 140 together form a valve and yoke assembly 150. In FIG. 4, the first bracket 118 is attached to both the valve body 112 and the second bracket 154. The second bracket 154 includes first and second parallel mounting arms 160, a mounting bridge portion 164, and an aperture 168 formed in the mounting bridge portion 164. The mounting bridge portion 164 connects the first and second parallel mounting arms 160 and is perpendicularly disposed relative to the first and second parallel mounting arms 160. Similarly to the first bracket 118, each of the parallel mounting arms 160 forms a right angle with the mounting bridge portion 164 at its connecting joint. The mounting arms 160 and mounting bridge portion 164 form an inverted U-shaped bracket 154 relative to the first bracket 118. The first and second parallel mounting arms 160 extend away from the mounting bridge portion 164 in a parallel direction to the first and second parallel arms 122 of the first bracket 118. The aperture 168 of the second bracket 154 is circular and is sized to receive a portion of the round bushing 140, specifically the top portion 148 of the bushing 140. The mounting bridge portion 164 is parallel to the bridge portion 126 of the first bracket 118 such that when the second bracket 154 is attached to the first bracket 118, an exterior surface 172 of the mounting bridge portion 164 of the second bracket 154 lies flat against an exterior surface 152 of the bridge portion 126 of the first bracket 118, and the apertures 134, 168 of the first and second brackets 118, 154 are coaxially aligned. In another example, the first bracket 118 of the yoke 114 may be attached to the second bracket 154 so long as the aperture 134 of the first bracket 118 and the aperture 168 of the second bracket 154 are parallel and are arranged to align with the longitudinal axis A of the valve stem 116. As used herein, the term "yoke" may refer to a unitary component or a multi-piece yoke. For example, the yoke 114 may include just one bracket 118, as shown in FIG. 3, which is configured to attach to separate actuator mounting bracket, such as the actuator mounting bracket 154 of FIG. 4. In another example, the "yoke" may refer to both the first bracket 118 and the second bracket 154 arranged in accordance with FIG. 4 and together form the "yoke" 114. Accordingly, the term "second bracket" may refer to a separate actuator mounting bracket or to a second component of the yoke 114.

FIG. 4 illustrates an actuator 176 operatively coupled to the control valve 110 via the valve and yoke assembly 150. The second bracket 154 is attached to the first bracket 118 such that the aperture 134 of the first bracket 118, the aperture 168 of the second bracket 154, and the bushing 140 are coaxially aligned with the longitudinal axis A of the valve stem 116. The actuator 176 of FIG. 4 is a schematic representation of a conventional actuator 176 and includes an actuator shaft 180 having a coupler shaft 182, which is configured to couple the top portion 120 of the valve stem 116 of the control valve 110 to an output of the actuator 176. The actuator shaft 180 automatically aligns with the valve stem 116 when the actuator shaft 180 is inserted into the bushing 140 that is partially engaging each of the aperture 168 of the second bracket 154 and the aperture 134 of the first bracket 118. The yoke 114 may support and/or absorb any axial force imparted onto the control valve 110 as the actuator 176 is mounted to the valve and yoke assembly 150. The first and second brackets 118, 154 of the yoke 114 receive the axial force that is typically exerted onto a valve stem 116 of a floating ball valve during installation. The second bracket 154 and the first bracket 118 may be attached by vertically disposed fasteners that traverse through bores formed in the bridge portion 126 of the first bracket 118 and the mounting bridge portion 164 of the second bracket 154.

Figure 5:
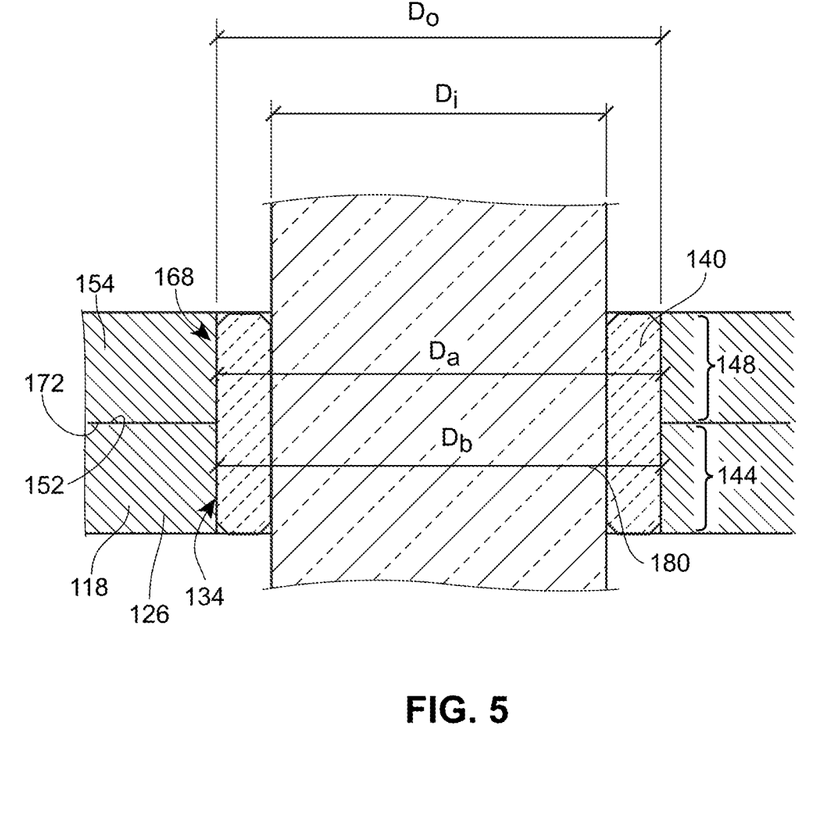
FIG. 5 is a partial cross-sectional view of a bushing, an actuator shaft, and the valve and yoke assembly of FIG. 4.

Turning now to FIG. 5, the bushing 140 includes an inner diameter $D_i$ and an outer diameter $D_o$, where the outer diameter $D_o$ is sized to engage with interior walls of the apertures 134, 168 of the first and second brackets 118, 154. The inner diameter $D_i$ is sized to provide a clearance fit with the actuator shaft 180. The aperture 134 of the first bracket 118 is sized to receive the bottom portion 144 of the bushing 140 and the aperture 168 of the second bracket 154 is sized to receive the top portion 148 of the bushing 140. In a preferred example, the bushing 140 is fixedly attached to the first bracket 118 by being affixed within the aperture 134 of the first bracket 118. In this example, the bushing 140 may not be affixed within the aperture 168 of the second bracket 154 and instead is sized for an alignment fit to facilitate the bushing 140 being inserted into the aperture 168 of the second bracket 154. In this case, the aperture 134 of the first bracket 118 may include a diameter $D_a$, the aperture 168 of the second bracket 154 may include a diameter $D_b$, where the diameter $D_b$ is greater than the diameter $D_a$. The diameter $D_b$ is greater than the diameter $D_a$ so that the bottom portion 144 of the bushing 140 is affixed within the aperture 134 of the first bracket 118 and the top portion 148 of the bushing 140 is engaged with the aperture 168 of the second bracket 154 by an alignment fit. The diameter $D_a$ and the diameter $D_b$ of the apertures 134, 168 may be slightly different in dimension, but sufficient to minimize any side movement of the actuator stem 180 when disposed through the yoke 114. In another example of the assembly, the top portion 148 of the bushing 140 may be affixed within the aperture 168 of the second bracket 154, and sized for an alignment fit to the aperture 134 of the first bracket 118. In this example, the diameter $D_a$ would be greater than the diameter $D_b$.

The valve apparatus 100 of FIG. 3 and/or the valve and yoke assembly 150 of FIG. 4 may be pre-assembled prior to field installation to guarantee the axial alignment of the bushing 140, the yoke 114, and the valve stem 116. To guarantee alignment, the apparatus 100 and assembly 150 include a tamper evident feature 200 that may provide a visual indicator that the first bracket 118 of the yoke 114 has been removed or detached from the valve body 112. By removing the yoke 114 from the valve body 112, the alignment of the bushing 140 and/or the alignment of the yoke 114 and the valve stem 116 can no longer be guaranteed. In the example shown in FIG. 6, the tamper evident feature 200 may include a dowel 204 at least partially disposed within a bore 208 formed in one of the parallel front and back sides 130 of the valve body 112. The dowel 204 is also partially disposed within a bore 212 formed in one of the parallel arms 122 of the first bracket 118 of the yoke 114. In an untampered configuration, the dowel 204 may be disposed slightly inward from an outer surface 216 of the parallel arm 122. To remove the first bracket 118 from the valve body 112, all fastening devices must be removed and the dowel 204 must be inserted deeper into the bore 208 of the valve body 112. The bore 208 of the valve body 112 is sized to completely receive the dowel 204 to allow removal of the first bracket 118 from the valve body 112. So configured, if the first bracket 118 of the yoke 114 was removed from the valve body 112 and replaced with a different yoke or mounting bracket, the dowel 204 would be driven into the bore 208 of the valve body, thereby indicating a tamper event has occurred that may have compromised the alignment of the bushing 140 and the valve stem 116. The tamper feature 200 may include one or more embedded dowels 204, and the dowels 204 may be embedded in various locations where the valve body 112 and the yoke 114 overlap and/or touch. The dowels 204 may be disposed in one or both parallel arms 122 of the first bracket 118 and front and back sides 130 of the valve body 112. In another exemplary form of the valve and yoke assembly, a tamper evident feature may be placed between the first and second brackets 118, 154 to indicate whether the second bracket 154 was removed from the first bracket 118.

The valve apparatus 100 of the present disclosure may be configured to attach to a wide variety of mounting plates and/or actuators and is not limited to attaching to the actuator mounting bracket 154 of FIG. 4. For example, the valve apparatus 100 may be sold separately from the second bracket 154. In another example, the valve apparatus 100 may be sold with the second bracket 154 such that the first bracket 118 is fixedly attached to the valve body 112 and the second bracket 154 is removably attached to the first bracket 118. A tamper evident feature 200 may be installed in either the valve apparatus 100 or the valve and yoke assembly 150 prior to shipment or sale of the units. Further, the valve and yoke assembly 150 may include a thrust bearing 220 attached to the coupler shaft 182 of the actuator shaft 180, as shown in FIG. 4. The thrust bearing 220 may keep an axial load from being transferred to the valve stem 116 when an actuator 176 is mounted to the control valve 110.

According to the teachings of the present disclosure, a method of operatively coupling an actuator to a control valve will be described and with reference to FIGS. 3-6. The step of aligning the bushing 140 with the longitudinal axis of the valve stem 116 may be performed before fastening the yoke 114 to the valve body 112 such that the bushing 140 remains in alignment with the longitudinal axis of the valve stem 116. The bushing may be fixedly arranged within the aperture 134 of the yoke 114 and fastening the yoke 114 to the valve body 112 may include fixedly attaching the yoke 114 to the valve body 112, as previously described.

Figure 6:
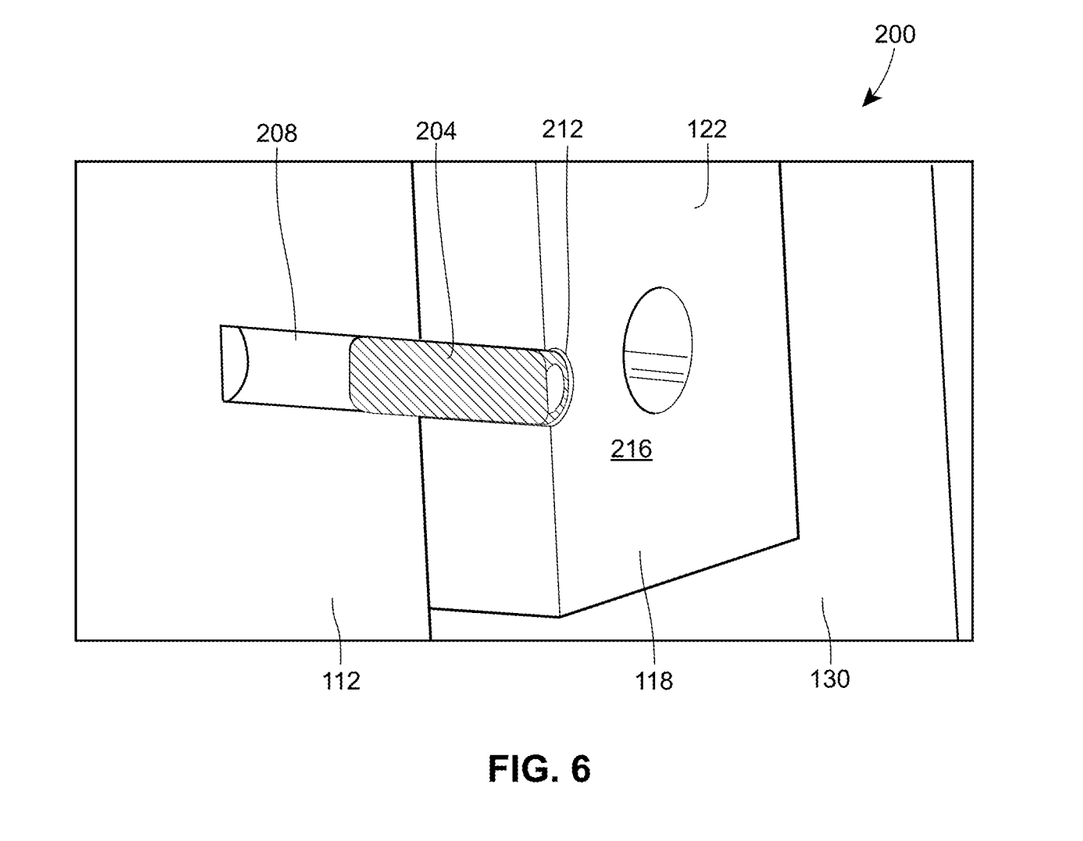
FIG. 6 is a partial sectional view of tamper a evident feature constructed in accordance with the principles of the present disclosure.

Optionally, the tamper evident feature 200 may be installed when the valve apparatus 100 is assembled. To install the tamper evident feature 200, a bore 208 may be formed in the valve body 112 and a bore 212 may be formed in the yoke 114, and specifically formed so that the bore 208 of the valve body 112 and bore 212 of the yoke 114 are aligned and are arranged to overlap when the yoke 114 is attached to the valve body 112. A dowel 204 may be inserted through the bores 208, 212 such that the dowel 204 is partially disposed within the bore 208 of the valve body 112 and partially disposed within the bore 208 of the yoke 114. The embedded dowel 204 of the tamper evident feature 200 allows a technician, operator, or skilled person to determine whether an occurrence of a tampering event, such as removal and replacement of the yoke 114, has occurred. The tampering event may be determined by inspecting a location of the dowel 204 relative to the bore 212 of the yoke 114. As discussed previously, a tampering event may be identified if the dowel 204 is completely disposed within the bore 208 of the valve body 212.

Further, an actuator mounting bracket 154 may be attached to the yoke 114 and arranged for an aperture 168 of the mounting bracket 168 to coaxially align with the aperture 134 of the yoke 114. Attaching the mounting bracket 154 to the yoke 114 may include aligning the aperture 168 of the second bracket 154 with an outer diameter $D_o$ of the bushing 140 and inserting a portion 148 of the bushing 140 into the aperture 168 of the mounting bracket 154. An actuator shaft 180 of an actuator 176 may then be inserted through the bushing 140 that is both partially engaged with the aperture 134 of the yoke 114 and partially engaged in the aperture 168 of the mounting bracket 154. A thrust bearing 220 may be provided to the coupler shaft 182 of the actuator shaft 180. The actuator shaft 180 may then be coupled via the coupler shaft 182 to the top portion 120 of the valve stem 116 extending from the valve body 112.

As previously discussed, the valve body 112 may be fixedly attached to the yoke 114, specifically the first bracket 118 of the yoke 114, and may be shipped to a customer such that the valve stem 116 is aligned with the bushing 140 and the valve body 112 and the yoke 114 are configured to operatively couple to an actuator.

In accordance with the disclosed example, it is possible to address various valve stem alignment issues using aspects of known technology, and also to provide for temper evident feature that does not compromise the performance of the yoke. In accordance with the exemplary form outlined herein, it is possible to subject a valve stem to a desired amount of axial load, side load, or bending moment to provide adequate valve stem support and maintain alignment of the valve stem with the actuator shaft. It is also possible to follow the teachings herein in order to use no more packing than the minimum required to provide axial support to the valve stem. This approach minimizes the instances of error when mounting an actuator to a control valve as well as minimizes adverse effects of thermal expansion of the packing, and also reduces packing friction. It may also be possible to install a thrust bearing to the coupler shaft to limit the axial force onto the valve stem and into the floating ball element, thereby limiting instances of the floating ball valve being forced out of the valve seat when an actuator is mounted to the valve stem. The disclosed assembly may result in a valve that is more suitable for long service and infrequent maintenance.

When assembled in accordance with the exemplary form of the valve and yoke assembly outlined herein, the resulting valve and/or the valve and yoke assembly exhibits improved performance and lifespan as compared to existing floating ball valves. In accordance with the disclosed example, the present improved valve and yoke assembly outlined herein may provide additional axial support to the valve stem, limiting instances of misalignment, packing leakage, and galling. The present improved design also provides a self-aligning bushing that may facilitate actuator mounting. The present improved design also provides a tamper evident feature such that a field technician can readily inspect and identify whether a valve and yoke assembly has been compromised prior to installation. Further, the present exemplary design does not require a field technician to align the actuator shaft to the valve stem for installation. The exemplary form of the present disclosure may experience several additional advantages. For example, the sizes for actuator shaft diameter and drive type may be standardized so that a single, standardized mounting kit may be used with multiple valve sizes.

Numerous modifications and alternative embodiments of the invention will be apparent to those skilled in the art in view of the forgoing description. Accordingly, this description is to be construed as illustrative only and is for the purpose of teaching those skilled in the art the best mode of carrying out the invention. The details of the present disclosure may be varied without departing from the spirit of the invention, and the exclusive use of all modifications which are within the scope of the claims is reserved.

The invention claimed is:

1. A valve apparatus comprising:
   a control valve including valve body having an inlet, an outlet, and a flow path extending between the inlet and the outlet;
   a rotational valve stem extending along a longitudinal axis, the valve stem having a top portion and a bottom portion, the bottom portion disposed within the valve body, the valve stem operatively coupled to a control element movably disposed in the flow path;
   a yoke attached to the valve body and arranged to operatively couple the valve body to an actuator, the yoke including a first bracket having an aperture and a second bracket having an aperture;
   a bushing arranged to align an actuator shaft of the actuator to the longitudinal axis of the valve stem, the bushing having a first portion and a second portion, the first portion engaging within the aperture of the first bracket and the second portion engaging the aperture of the second bracket; and
   a dowel at least partially disposed within a bore formed in the valve body and at least partially disposed within a bore formed in the first bracket of the yoke, wherein the bore of the valve body is sized to receive the dowel to allow the yoke to detach from the valve body.

2. The valve apparatus of claim 1, wherein the bushing is affixed within at least one of the aperture of the first bracket and the aperture of the second bracket.

3. The valve apparatus of claim 1, wherein the first bracket of the yoke is fixedly attached to the valve body and removably attached to the second bracket.

4. The valve apparatus of claim 1, wherein the aperture of the first bracket is coaxially aligned with the aperture of the second bracket, the apertures of the first and second brackets being coaxially aligned with the longitudinal axis of the valve stem.

5. The valve apparatus of claim 1, wherein the first bracket is adjacent to the second bracket when the first bracket is attached to the second bracket, the aperture of the first bracket being parallel to the aperture of the second bracket.

6. A valve and yoke assembly comprising:
   a valve body having an inlet, an outlet, and a flow path extending between the inlet and the outlet;
   a rotational valve stem at least partially disposed within the valve body and extending along a longitudinal axis, the valve stem operatively coupled to a control element disposed in the flow path and moveable between an open position and a closed position;
   a yoke attached to the valve body and including an aperture, the yoke arranged to operatively couple an actuator to the valve body;
   an actuator mounting bracket removably attached to the yoke and including an aperture;
   a bushing at least partially engaging the aperture of the yoke and at least partially engaging the aperture of the actuator mounting bracket, the bushing aligned with the longitudinal axis of the valve stem and arranged to operatively align the valve stem with an actuator shaft, the actuator comprising an actuator shaft operatively coupled to the valve stem, wherein the actuator shaft is disposed through the bushing, the aperture of the actuator mounting bracket, and the aperture of the yoke, the actuator shaft being coaxially aligned with the longitudinal axis of the valve stem; and
   a thrust bearing attached to the actuator shaft.

7. The assembly of claim 6, wherein a portion of the bushing is disposed outside of the yoke, the portion of the bushing being sized for insertion into the aperture of the actuator mounting bracket and sized to receive the actuator shaft of the actuator.

8. The assembly of claim 6, wherein the yoke includes a first parallel arm, a second parallel arm, and a bridge portion connecting the first and second parallel arms, the first and second parallel arms and the bridge portion forming a U-shaped bracket.

9. The assembly of claim 6, wherein the bushing extends along the longitudinal axis of the valve stem, the bushing having an outer diameter sized for insertion into the aperture of the actuator mounting bracket and an inner diameter sized to receive the actuator shaft.

10. The assembly of claim 6, wherein the aperture of the yoke includes a diameter and the aperture of the actuator mounting bracket includes a different diameter, wherein the diameter of the aperture of the actuator mounting bracket is greater than the diameter of the aperture of the yoke.

11. The assembly of claim 6, wherein the bushing includes an inner diameter and an outer diameter, the inner diameter sized to provide a clearance fit with the actuator shaft of an actuator, and the outer diameter sized to provide a rigid connection fit with the yoke and an alignment fit with an aperture of the actuator mounting bracket.

12. A method of mounting a yoke to a valve, the method comprising:
providing a valve body having an inlet, an outlet, and a flow path extending between the inlet and the outlet, a valve stem extending along a longitudinal axis and having a top portion protruding from the valve body and a bottom portion disposed within the valve body, the valve stem operatively coupled to a control element movably disposed in the flow path;
providing a yoke including an aperture, a first arm, and a second arm; and
placing a bushing at least partially disposed in the aperture of the yoke, the bushing arranged to align an actuator shaft of an actuator with the longitudinal axis of the valve stem;
aligning the bushing of the yoke with the longitudinal axis of the valve stem by placing the first arm and the second arm adjacent to the valve body;
fastening the first arm and the second arm of the yoke to the valve body such that the bushing remains in alignment with the longitudinal axis of the valve stem; and
attaching an actuator mounting bracket to the yoke by aligning an aperture of the actuator mounting bracket with an outer diameter of the bushing and inserting a portion of the bushing into the aperture of the actuator mounting bracket, the aperture of the actuator mounting bracket coaxially aligned with the aperture of the yoke.

13. The method of claim 12, further comprising fixedly arranging the bushing within the aperture of the yoke.

14. The method of claim 12, further comprising inserting a dowel through a bore formed in the valve body and a bore formed in the yoke, the bore formed in the yoke being coaxially aligned with the bore of the valve body, the dowel partially disposed within the bore of the valve body and partially disposed within the bore of the yoke.

15. The method of claim 14, further comprising determining an occurrence of a tampering event to the valve body and the yoke by inspecting a location of the dowel relative to the bore of the yoke, and further identifying the occurrence of the tampering event when the dowel is completely disposed within the bore of the valve body.

16. The method of claim 12, further comprising inserting an actuator shaft of an actuator through the bushing partially disposed within the aperture of the yoke and partially disposed within the aperture of the actuator mounting bracket, and operatively coupling the actuator shaft of the actuator to the top portion of the valve stem.

* * * * *

UNITED STATES PATENT AND TRADEMARK OFFICE
CERTIFICATE OF CORRECTION

PATENT NO. : 10,539,241 B2  
APPLICATION NO. : 15/726654  
DATED : January 21, 2020  
INVENTOR(S) : Trenton F. Jackson et al.

Page 1 of 1

It is certified that error appears in the above-identified patent and that said Letters Patent is hereby corrected as shown below:

In the Specification

At Column 4, Line 52, "tamper a evident" should be -- a tamper evident --.

At Column 7, Line 27, "actuator stem 180" should be -- actuator shaft 180 --.

At Column 8, Line 55, "valve body 212." should be -- valve body 112. --.

At Column 8, Line 58, "mounting bracket 168" should be -- mounting bracket 154 --.

At Column 8, Line 62, "portion 148" should be -- top portion 148 --.

At Column 9, Line 13, "temper" should be -- a tamper --.

At Column 9, Line 56, "forgoing" should be -- foregoing --.

In the Claims

At Column 11, Line 31, "arm; and" should be -- arm; --.

Signed and Sealed this  
Eighth Day of December, 2020

Andrei Iancu  
*Director of the United States Patent and Trademark Office*